US006219466B1

United States Patent
Kyo

(12) United States Patent
(10) Patent No.: US 6,219,466 B1
(45) Date of Patent: Apr. 17, 2001

(54) APPARATUS FOR IMPLEMENTING PIXEL DATA PROPAGATION USING A LINEAR PROCESSOR ARRAY

(75) Inventor: Sholin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/166,214

(22) Filed: Oct. 5, 1998

(51) Int. Cl.[7] ........................................ G06K 9/54
(52) U.S. Cl. .................. 382/307; 382/205; 382/304; 345/505
(58) Field of Search .................... 382/303, 304, 382/307, 308, 205; 345/502, 505, 508, 513; 712/10, 11, 14

(56) References Cited

U.S. PATENT DOCUMENTS

| | | | |
|---|---|---|---|
| 4,484,346 | * 11/1984 | Sternberg et al. | 382/205 |
| 5,048,108 | * 9/1991 | Basille et al. | 382/304 |
| 5,117,468 | * 5/1992 | Hino et al. | 382/308 |
| 5,136,662 | * 8/1992 | Maruyama et al. | 382/304 |
| 5,319,586 | 6/1994 | Gupta et al. | 364/735 |
| 5,630,154 | 5/1997 | Bolstad et al. | 395/800 |
| 5,689,450 | * 11/1997 | Kurokawa et al. | 712/11 |
| 5,838,985 | * 11/1998 | Ohki | 712/14 |
| 5,995,669 | * 11/1999 | Shingu et al. | 382/237 |

* cited by examiner

Primary Examiner—Amelia Au
Assistant Examiner—Jingge Wu
(74) Attorney, Agent, or Firm—Foley & Lardner

(57) ABSTRACT

An image processing apparatus is provided with a linear processor array which includes a plurality of linearly coupled processing elements. The apparatus further includes a plurality of local memories each of which takes a form of one-dimensional pixel data memories. The local memories are respectively assigned to the plurality of processing elements. Further, the local memories are arranged so as to store in combination a two-dimensional pixel image to be processed. A plurality of buffers are respectively assigned to the processing elements. Each buffer stores pixel location information of at least one center pixel from which a unique pixel value is to be propagated if the center pixel exists on a corresponding local memory. With the arrangement mentioned above, in order to accelerate pixel data propagation in the two-dimensional pixel image, a plurality of register units are respectively assigned to the plurality of processing elements. Each register can be accessed by the adjoining processing elements and has first to third memory fields. The first memory field receives the at least one center pixel from the associated buffer. The second memory field stores the unique pixel data. The third memory field stores pixel positions which surround the center pixel and to which the unique pixel data should be propagated.

4 Claims, 10 Drawing Sheets

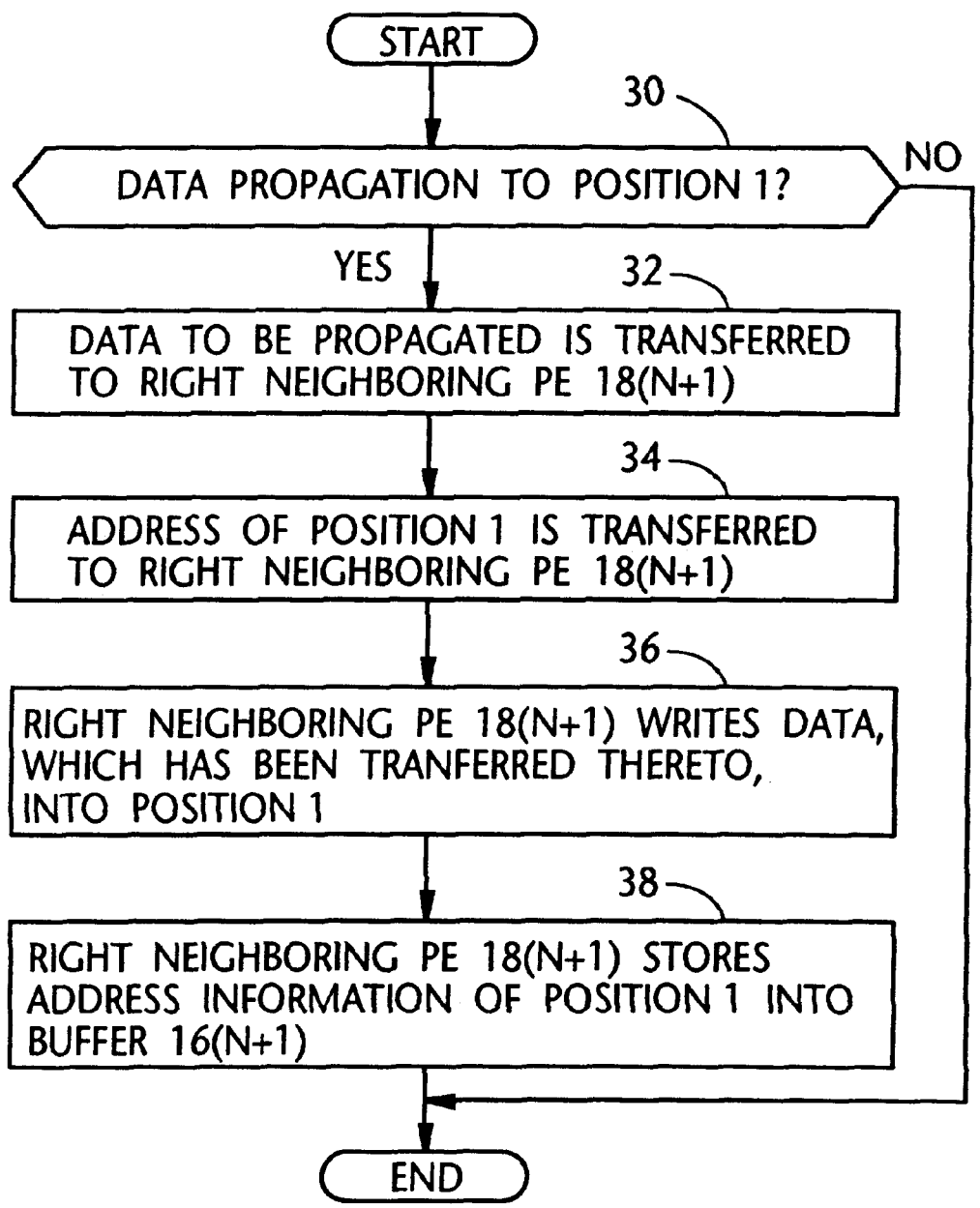

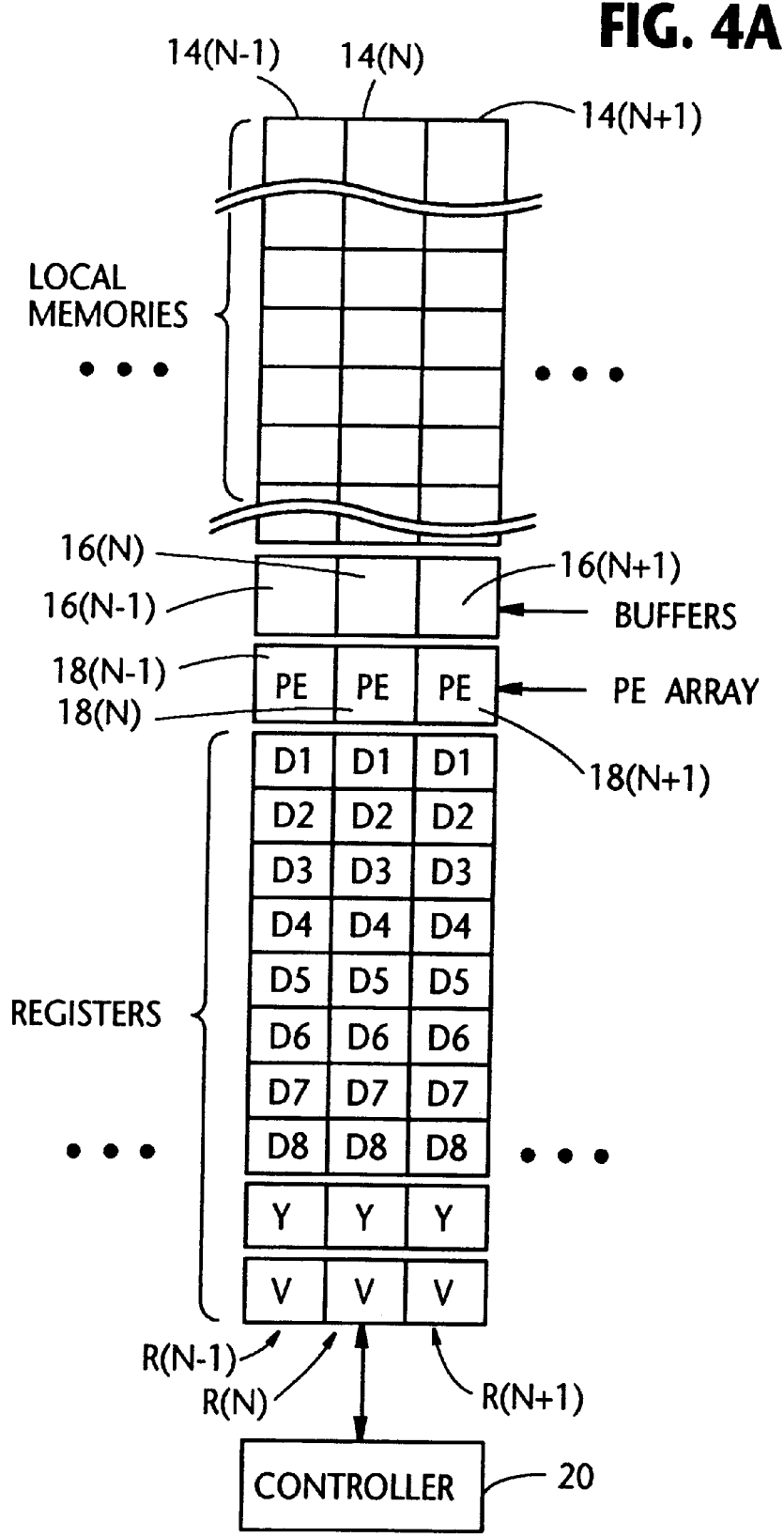

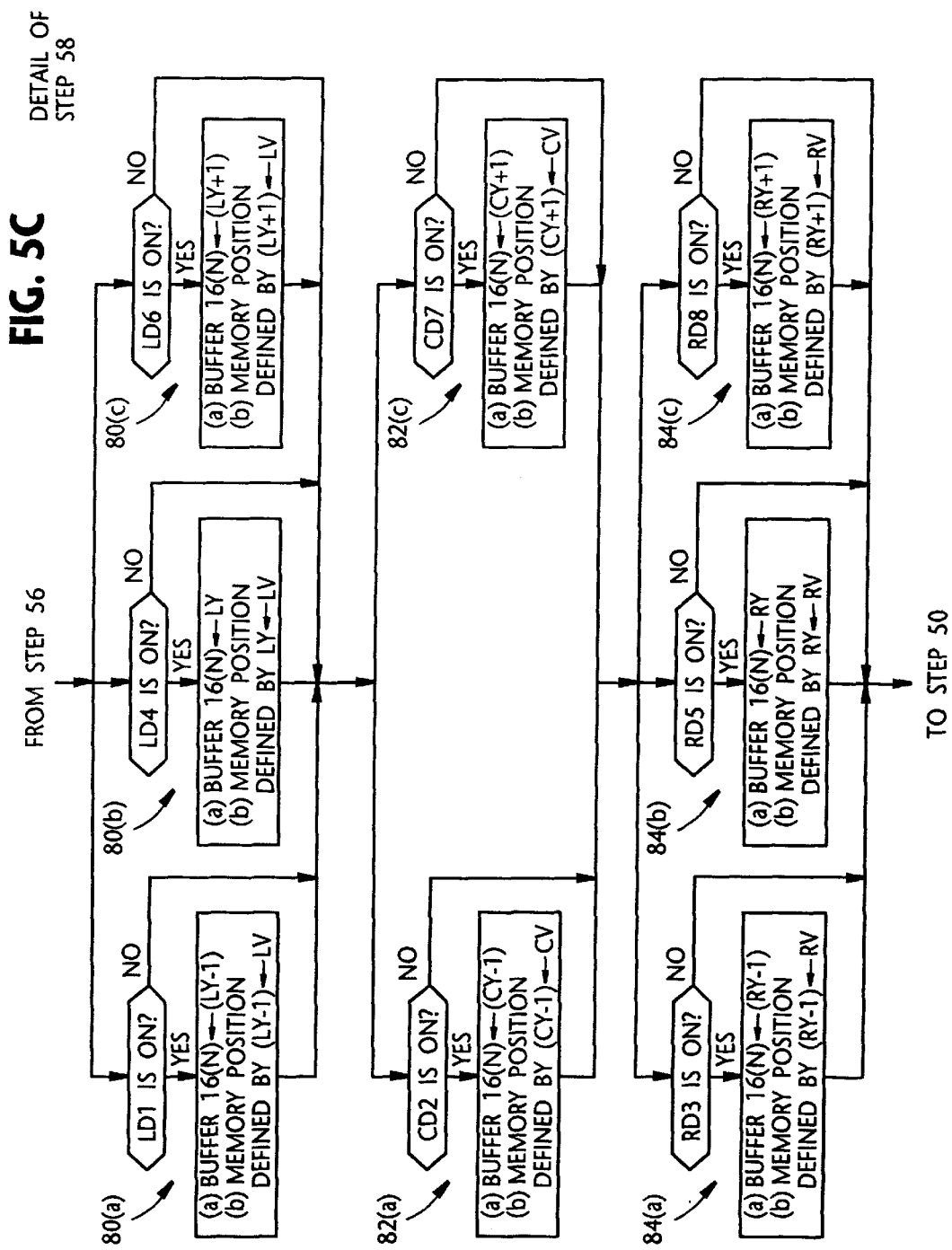

APPARATUS FOR IMPLEMENTING PIXEL DATA PROPAGATION USING A LINEAR PROCESSOR ARRAY

BACKGROUND OF THE INVENTION

1. Field of the Invention

The present invention relates generally to improved techniques for pixel data propagation using a linearly connected array of processors, and more specifically to such techniques via which pixel data propagation within a two-dimensional image is implemented at a considerably high speed.

2. Description of the Related Art

In order to specify or distinguish a region from others within a two-dimensional digital image, it is known in the art to use a so-called "parallel propagation processing technique" using a linear processor array. According to this technique, starting from one or more distinctive pixels in the two-dimensional digital image, unique pixel data is written into in parallel to the surrounding pixels. This technique is applicable to the case where a plurality of regions within a two-dimensional image are to be distinguished by labeling different unique numbers to respective regions. Further, the above mentioned technique is also used to determine a shape of a region in a two-dimensional image by tracing the contour thereof. A linear processor array per se is well known in the art, which is disclosed in U.S. Pat. Nos. 5,319,586 and 5,630,154 merely by way of example.

Before turning to the present invention, it is deemed preferable to briefly describe a conventional technique with reference to FIGS. 1A–1C and 2.

FIG. 1A is a diagram schematically showing a two-dimensional pixel image 10 which consists of X by Y pixels. For the sake of simplifying the disclosure, the image 10 is such as to include a region 12 to be specified for later operations which are irrelevant to the present invention. In order to distinguish the region 12 from the remaining portion of the image 10, it is necessary to write unique data into each pixel of the region 12. In brief, the present invention is concerned with the writing of such unique data into an area to be distinguished.

Referring to FIG. 1B, there is shown part of a conventional parallel image processing apparatus 13 which comprises a plurality of local memories 14(1)–14(X), a plurality of buffers 16(1)–16(X), and a plurality of processing elements (PEs) 18(1)–18(X). More specifically, the PEs 18(1)–18(X) are respectively assigned to the one-line pixels stored in the local memories 14(1)–14(X). The image 10 of FIG. 1A is written into the local memories 14(1)–14(X) each of which stores one-column (or one-line) pixel data. A controller 20 controls the overall operation of the PEs 18(1)–18(X).

Assuming that if a given buffer stores a pixel from which the data propagation process is to be initiated, the PE assigned to the buffer in question has already written or registered the address of the propagation start pixel in the buffer.

FIG. 1C is a diagram showing part of the arrangement of FIG. 1B. In FIG. 1C, a center pixel (or reference pixel) in the buffer 14(N) (1<N<X) is a pixel from which data propagation may be implemented to the pixel positions 1–8 which surrounds the center pixel. To be more precise, the pixel positions 1–8 are the possible positions to which a unique data can be propagated. That is, prior to implementing the data propagation, it is necessary to check if the data propagation should be implemented to each pixel position. It is understood that if the pixel position 1 is outside the region to be specified, the data propagation to the position 1 is not permitted. The operations of propagating the data of the center pixel (or reference pixel position) to one of the surrounding pixels are identical with one another, and hence, only the operation from the center pixel to the pixel position 1 will be described with reference to FIG. 2.

In FIG. 2, at step 30, a check is made to determine if data propagation to the pixel position 1 is necessary. If the answer is negative, the operation is terminated. Otherwise, the program goes to step 32 at which the PE 18(N) propagates a unique data to the right neighboring (adjacent) PE 18(N+1). At step 34, PE 18(N) transfers the address of the position 1 to PE(N+1). Following this, at step 36, PE(N+1) writes the unique data propagated from PE(N) to the position 1 whose address has been informed from PE(N). At step 38, PE(N+1) registers the address information of pixel position 1 at the buffer.

The above mentioned conventional technique, however, suffers from the problem that the number of processing steps becomes very large. That is, as shown in FIG. 2, four steps 32, 34, 36 and 38 are necessary at each iteration. Further, if the unique data at the center pixel should be propagated to all the eight surrounding positions 1–8, PE(N) must implement three times of data propagation to each of the right and left adjacent processing elements PE(N−1) and PE(N+1). In addition, PE(N) must carry out the data propagation two times within itself in connection with the position 2 and 7.

SUMMARY OF THE INVENTION

If is therefore an object of the present invention to provide an apparatus for implementing pixel data propagation using a linear processor array at a high speed relative to a conventional technique.

The object is fulfilled by improved techniques wherein an image processing apparatus is provided with a linear processor array which includes a plurality of linearly coupled processing elements. The apparatus further includes a plurality of local memories each of which takes a form of one-dimensional pixel data memories. The local memories are respectively assigned to the plurality of processing elements. Further, the local memories are arranged so as to store in combination a two-dimensional pixel image to be processed. A plurality of buffers are respectively assigned to the processing elements. Each buffer stores pixel location information of at least one center pixel from which a unique pixel value is to be propagated if the center pixel exists on a corresponding local memory. With the arrangement mentioned above, in order to accelerate pixel data propagation in the two-dimensional pixel image, a plurality of register units are respectively assigned to the plurality of processing elements. Each register can be accessed by the adjoining processing elements and has first to third memory fields. The first memory field receives the at least one center pixel from the associated buffer. The second memory field stores the unique pixel data. The third memory field stores pixel positions which surround the center pixel and to which the unique pixel data should be propagated.

One aspect of the present invention resides in 1. An image processing apparatus comprising: a linear processor array which includes a plurality of linearly coupled processing elements; a plurality of local memories each taking a form of one-dimensional pixel data memories, said local memories being respectively assigned to said plurality of processing elements, said plurality of local memories being arranged so as to store in combination a two-dimensional pixel image to be processed; a plurality of buffers respectively assigned to said plurality of processing elements, each of said buffers storing pixel location information of at least one center pixel from which a unique pixel value is to be propagated if said center pixel exists on a corresponding local memory; and a plurality of register units respectively assigned to said plurality of processing elements, each register being accessed by adjoining processing elements and having first to third memory fields, said first memory field receiving said at least one center pixel from the associated buffer, said second memory field storing the unique pixel data, and said third memory field storing pixel positions which surround the center pixel and to which the unique pixel data should be propagated.

BRIEF DESCRIPTION OF THE DRAWINGS

The features and advantages of the present invention will become more clearly appreciated from the following description taken in conjunction with the accompanying drawings in which like member or elements are denoted by like reference numerals and in which:

FIG. 2 is a flow chart which shows steps for describing the operations of the conventional apparatus shown in FIGS. 1B and 1C;

FIG. 4A is a diagram showing part of the arrangement of FIG. 3;

FIGS. 5A–5C are each a flow chart which shows steps which characterize the present invention.

DETAILED DESCRIPTION OF THE PREFERRED EMBODIMENTS

Figure 1A:
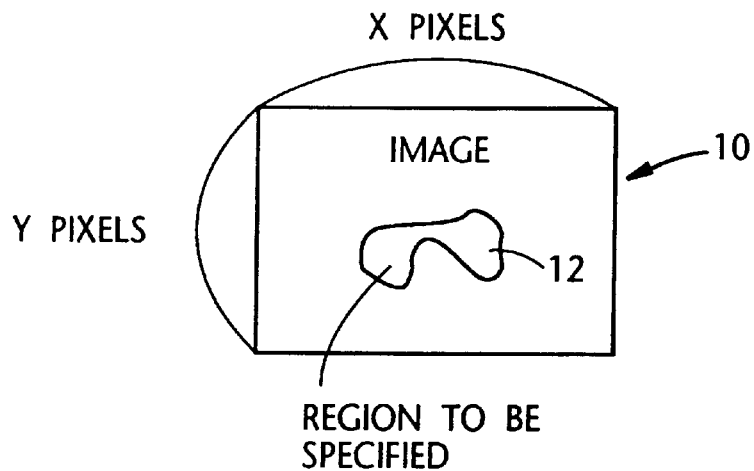
FIG. 1A is a diagram schematically showing a two-dimensional image for use in describing conventional techniques, having been described in the opening paragraphs of the instant disclosure.

One preferred embodiment of the present invention will be described with reference to FIGS. 3, 4A–4B, 5A–5C, and 6, wherein blocks and elements already referred to in the opening paragraphs are denoted by like reference numerals.

Figure 3:
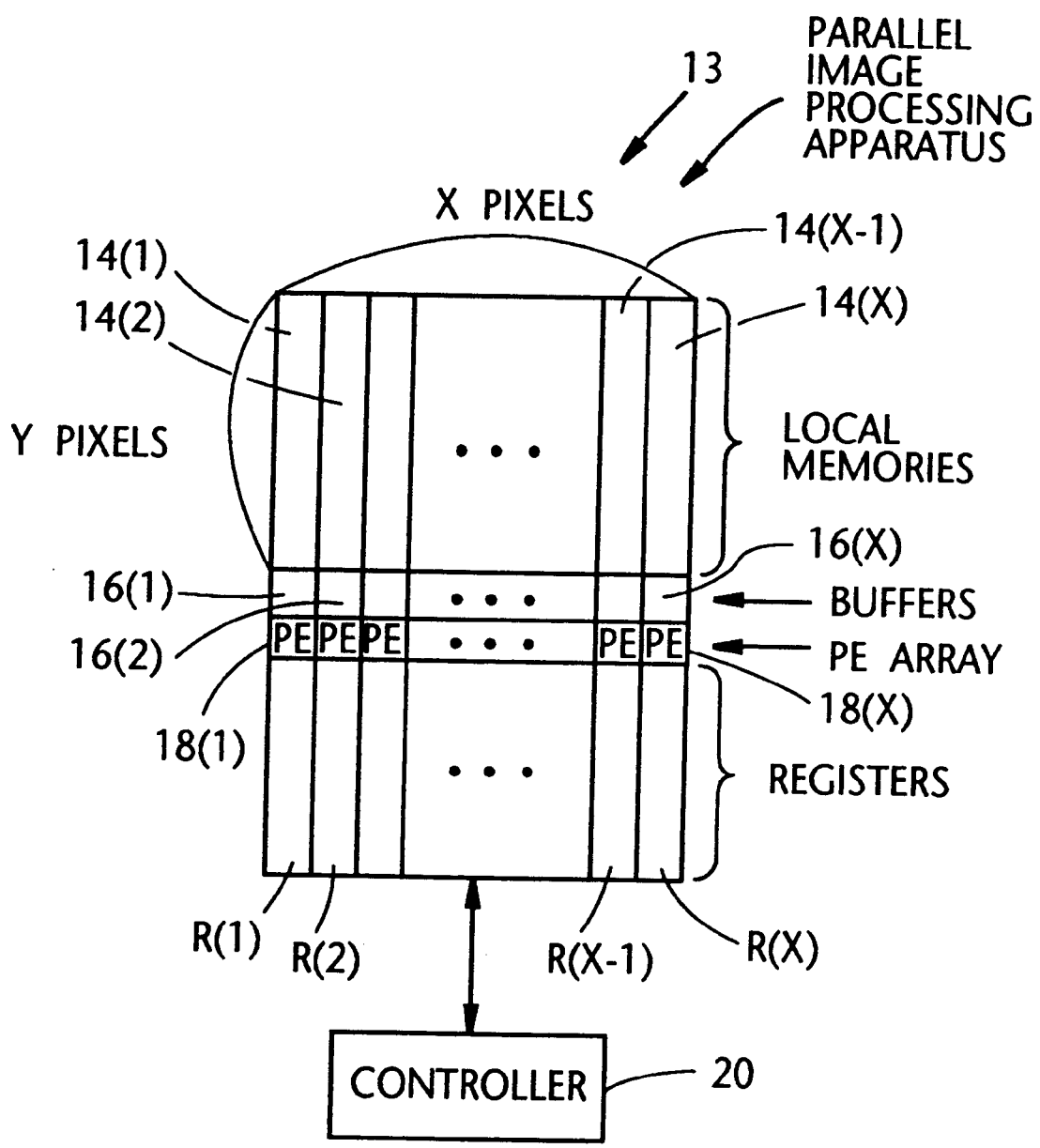
FIG. 3 is a diagram schematically showing a parallel image processing apparatus embodying the present invention.

FIG. 3 is a diagram schematically showing a parallel image processing apparatus embodying the present invention. Comparing FIGS. 3 and 1B, the arrangement of FIG. 3 is further provided with a plurality of registers R(1)–R(X) which are respectively assigned to the processing elements (PEs) 18(1)–18(X).

FIG. 4A shows part of the arrangement of FIG. 3 together with details of registers R(N−1), R(N), and R(N+1) wherein N is a positive integer of 1<N<X. As shown in FIG. 4A, each register is comprised of memory fields D1–D8, Y, and V.

Figure 1B:
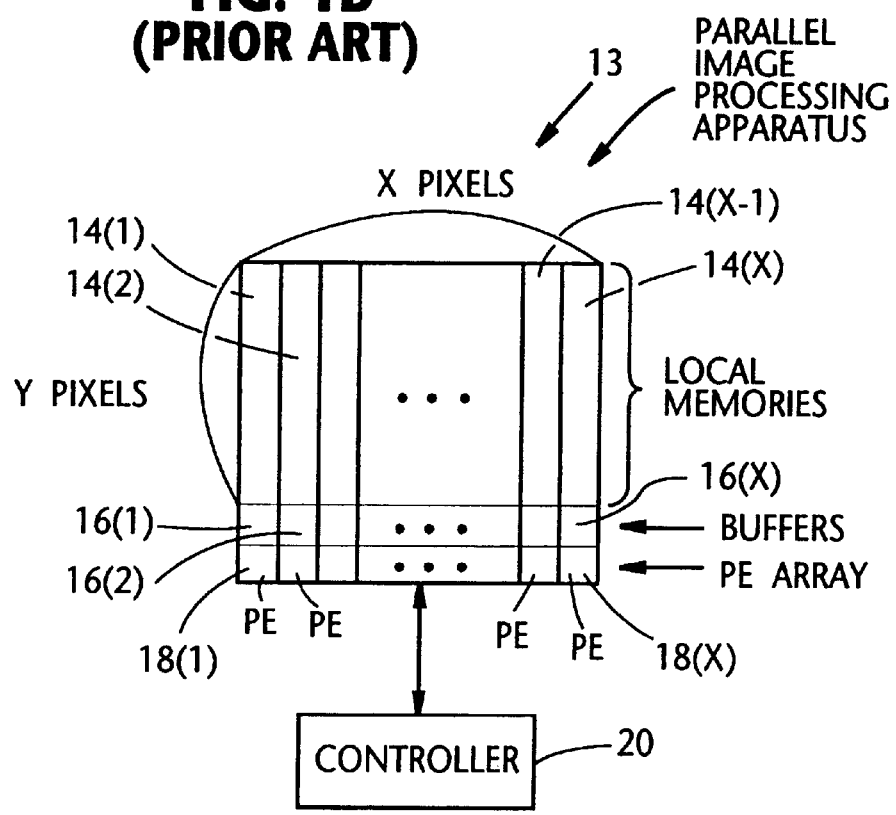
FIG. 1B is a diagram schematically showing a conventional parallel image processing apparatus, having been described in the opening paragraphs of the instant disclosure.
Figure 1C:
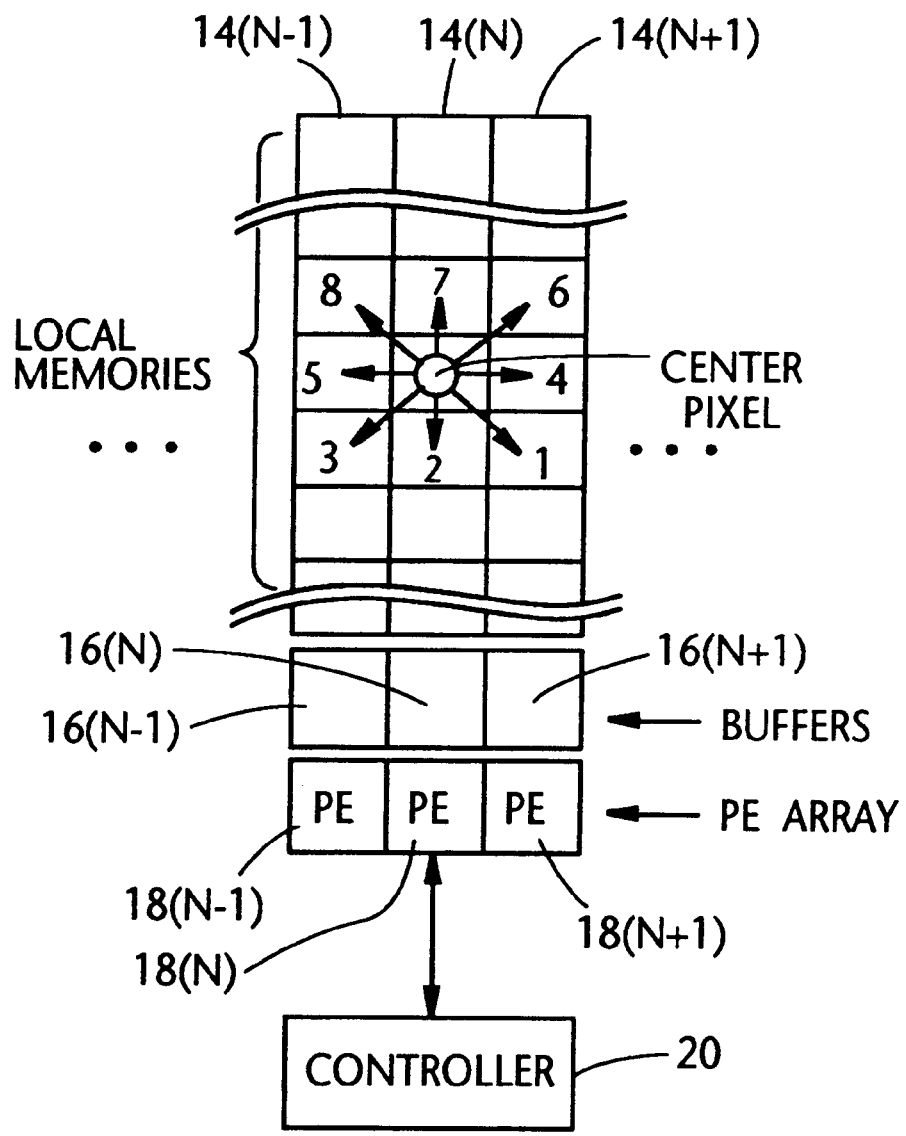
FIG. 1C is a diagram showing part of the arrangement of FIG. 1B.

One of the important features of the present invention is that each of the registers can be accessed by adjacent (viz., left and right) processing elements (PEs). The memory fields D1–D8 of the register are respectively assigned to the 8 (eight) propagation positions such as shown in FIG. 1C, and store the information indicative of which direction the pixel data is to be propagated. The memory field Y is provided to store a pixel address (location) from which the unique data is to be propagated (transferred), while the memory field V stores the value of the pixel (viz., unique data) which is actually propagated. On the other hand, the buffer stores one or more center pixel's addresses (locations). Note that it is possible for the buffer has previously stored a plurality of addresses of more than one center pixel. In this case, one of the center pixel's address stored in the buffer is picked up and then transferred to the memory field Y. However, for a better understanding of the present invention, it is assumed that the buffer has stored a signal center pixel's address (position).

Figure 4B:
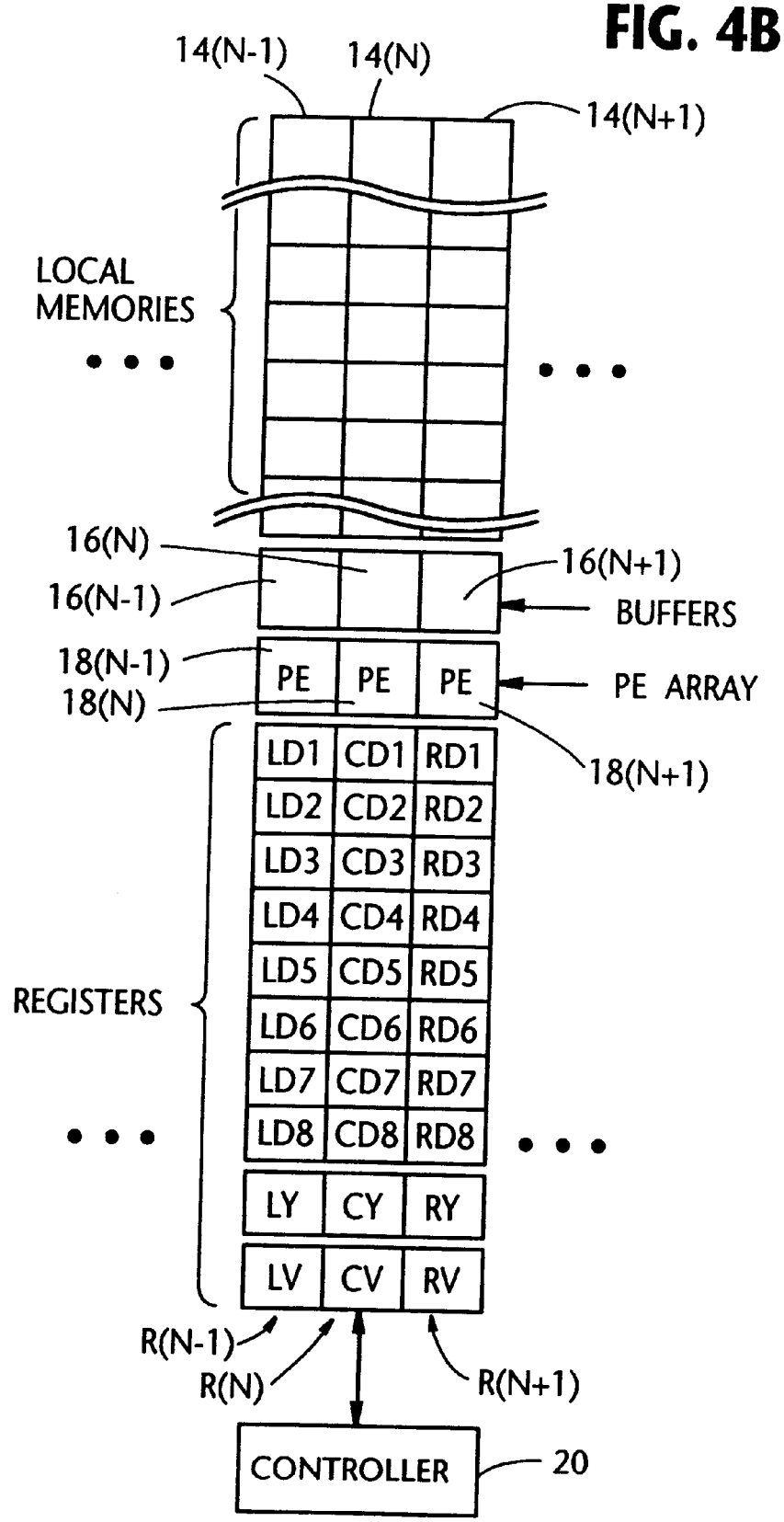
FIG. 4B is a diagram which is identical to that of FIG. 4A except for reference characters attached to blocks, this figures being presented for the convenience of simplifying the description of the disclosure of the embodiment.

FIG. 4B is identical with FIG. 3A except for the labeling of the register's memory fields. FIG. 4B is presented for the purpose of simplifying the description of the embodiment. That is, in FIG. 5B, each of the reference characters of the registers depicts the content of the corresponding memory field, and "L", "C" and "R" stand for Light, Center, and Right.

The operation of the instant embodiment will be described with reference to the flow charts depicted in FIGS. 5A–5C. It is assumed that a two-dimensional XY pixel image data to be processed, such as shown in FIG. 1A, has already been written into the local memories 14(1)–14(X) of FIG. 3. Assuming further that each PE has already checked its own line of pixels and determined a location of a propagation start pixel (if any). That is, the location information is an address at which the propagation start pixel is located and which has been stored in the corresponding buffer. As mentioned above, it is assumed that the address of a signal center pixel has been stored in the buffer.

Figure 5A:
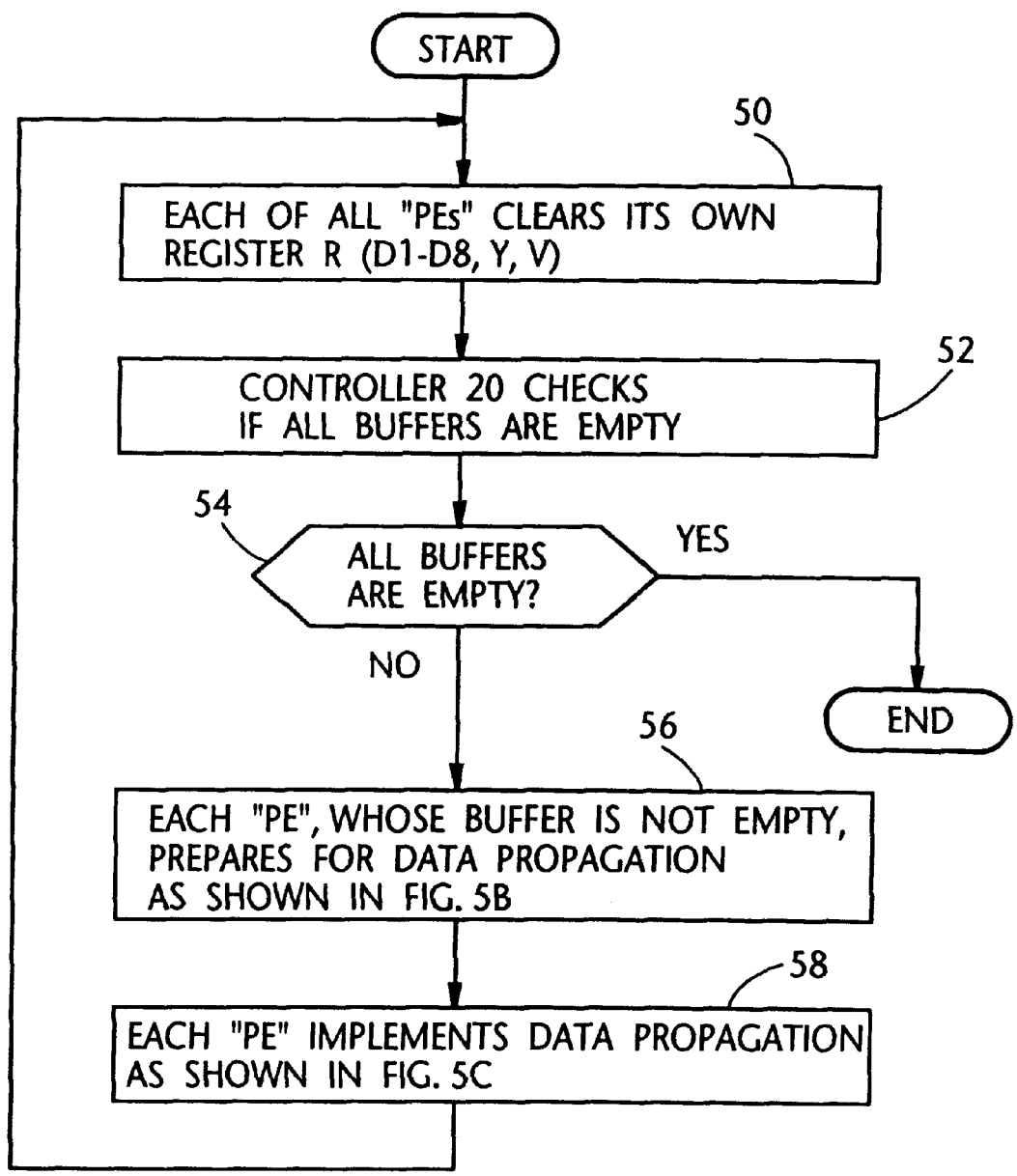

In FIG. 5A, at step 50, each of all processing elements 18(1)–18(X) (FIG. 3) clears the corresponding register that includes memory fields D1–D8, Y and V. Following this, at steps 52 and 54, the controller 20 checks to see if all buffers 16(1)–16(X) are empty. As mentioned above, if the data propagation is to be implemented, at least one buffer has already stored at least one operation starting pixel address. In other words, if all buffers 16(1)–16(X) are empty (have no address information), this means that propagation operation is no longer necessary. Thus, if an answer to the inquiry made at step 54 is positive (YES), the program is terminated. Otherwise (viz., if the answer at step 54 is negative), the program goes to step 56 at which each processing element (PE), whose buffer is not empty, prepares for data propagation as shown in FIG. 5B.

Figure 5B:
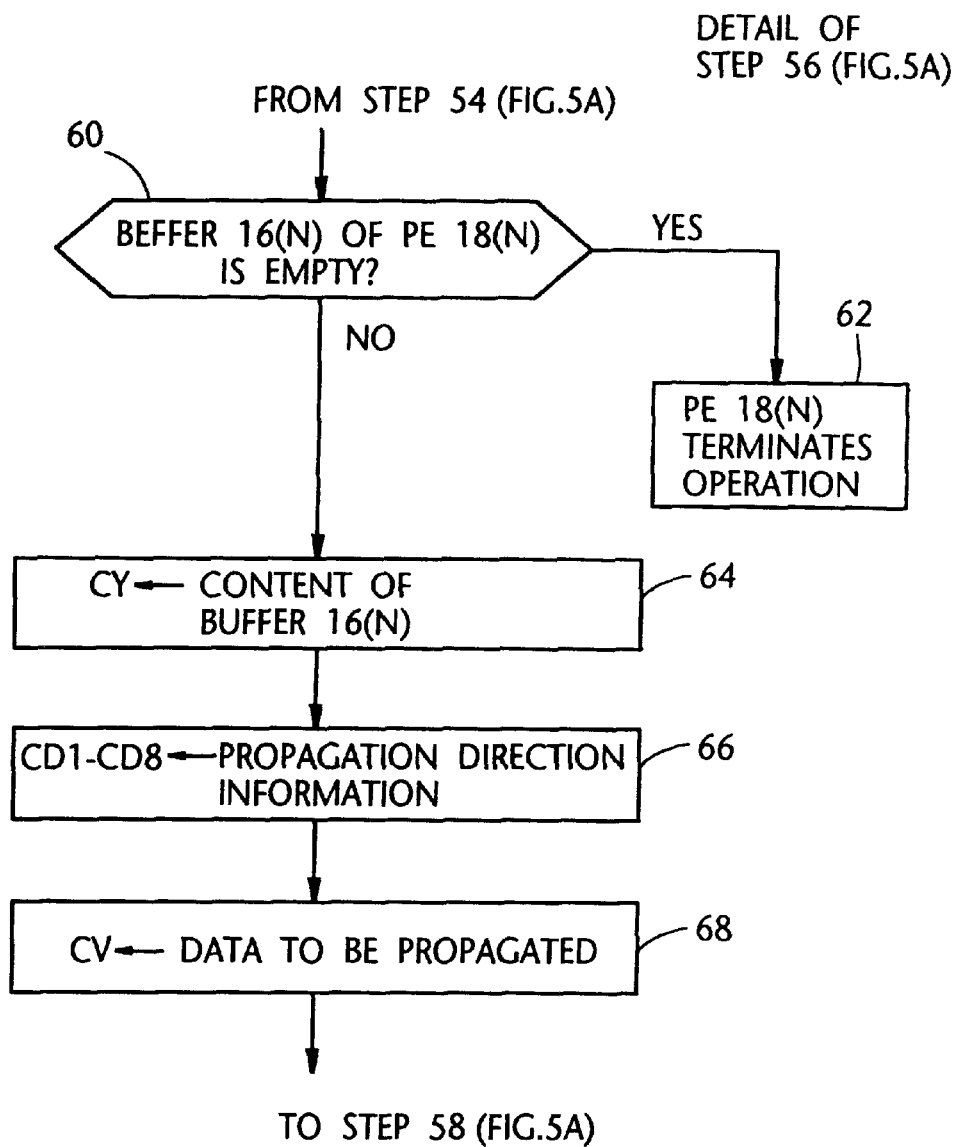

In FIG. 5B, only the operation of PE 18(N) will be described for the sake of simplifying the disclosure. In FIG. 5B, at step 60, if the buffer 16(N) of the processing element (PE) 18(N) is found empty, the PE 18(N) terminates the operation thereof at step 62. On the contrary, if the buffer 16(N) is not empty, the program proceeds to step 64 at which the content of the buffer 16(N) is transferred to the memory field CY. That is, the location information (viz., address) of the data propagation start pixel is written into the memory field CY. Thereafter, at step 66, the memory fields CD1–CD8 receive data propagation direction information from the processing element 18(N). More specifically, if the data propagation start pixel, stored in the buffer 16(N), can be propagated to the pixel 1, 4 and 6 of the right adjacent PE 18(N+1), then the memory fields CD1, CD4 and CD6 are rendered "on" by setting a flag bit (for example). By way of example, if the pixel 1 of the right adjacent PE 18(N+1) is located outside of the region to be specified, the field CD1 is not rendered "on". Subsequently, at step 68, data to be propagated is transferred to the memory field CV, after which the program goes to step 58 which is shown in detail in FIG. 5C. Note that the above mentioned operation is implemented at each of the other PEs.

Reference is made to FIG. 5C which shows details of step 58 (FIG. 5A) and which includes operations 80(*a*)–80(*c*), 82(*a*)–82(*b*), and 84(*a*)–84(*c*).

The PE 18(N) accesses the left adjacent register R(N−1) in the following operations 80(*a*)–80(*c*).

Operation 80(*a*): if the PE 18(N) determines that the value LD1 of the left adjacent PE 18(N−1) indicates "on", the PE 18(N) writes (LY−1: the value stored in the field Y minus 1) into the buffer 16(N). In the above, the "on" state of LD1 indicates that the pixel data propagates from the center pixel of the left local memory 14(N−1) in the direction toward the position 1 (FIG. 1C). The PE 18(N) writes the value LV stored in the field V of the left adjacent PE(N−1) into a pixel position of the local memory 14(N), which position is specified by (LY−1).

Operation 80(*b*): If the PE 18(N) determines that the value LD4 of the left adjacent PE 18(N−1) indicates "on", the PE 18(N) writes the value LY into the buffer 16(N). In the above, the "on" state of LD4 indicates that the pixel data propagates from the center pixel of the left local memory 14(N−1) in the direction toward the position 4 (FIG. 1C). The PE 18(N) writes the value LV stored in the field V of the left adjacent PE(N−1) into a pixel position of the local memory 14(N), which position is specified by LY.

Operation 80(*c*): If the PE 18(N) determines that the value LD6 of the left adjacent PE 18(N−1) indicates "on", the PE 18(N) writes (LY+1: the value stored in the field Y plus 1) into the buffer 16(N). In the above, the "on" state of LD6 indicates that the pixel data propagates from the center pixel of the left local memory 14(N−1) in the direction toward the position 6 (FIG. 1C). The PE 18(N) writes the value LV stored in the field V of the left adjacent PE(N−1) into a pixel position of the local memory 14(N), which position is specified by (LY+1).

The PE 18(N) accesses the register R(N) in the following operations 82(*a*)–82(*b*).

Operation 82(*a*): If the PE 18(N) determines that the value CD2 of its own indicates "on", the PE 18(N) writes (CY−1: the value stored in the field Y minus 1) into the buffer 16(N). In the above, the "on" state of CD2 indicates that the pixel data propagates from the center pixel of its own in the direction toward the position 2 (FIG. 1C). The PE 18(N) writes the value CV stored in the field V of its own into a pixel position of the local memory 14(N), which position is specified by (CY−1).

Operation 82(*b*): If the PE 18(N) determines that the value CD7 of its own indicates "on", the PE 18(N) writes (CY+1: the value stored in the field Y plus 1) into the buffer 16(N). In the above, the "on" state of CD7 indicates that the pixel data propagates from the center pixel of its own in the direction toward the position 7 (FIG. 1C). The PE 18(N) writes the value CV stored in the field V of its own into a pixel position of the local memory 14(N), which position is specified by (CY+1).

The PE 18(N) accesses the right adjacent register R(N+1) in the following operations 84(*a*)–84(*c*).

Operation 84(*a*): If the PE 18(N) determines that the value RD3 of the right adjacent PE 18(N+1) indicates "on", the PE 18(N) writes (RY−1: the value stored in the field Y minus 1) into the buffer 16(N). In the above, the "on" state of RD3 indicates that the pixel data propagates from the center pixel of the right local memory 14(N+1) in the direction toward the position 3 (FIG. 1C). The PE 18(N) writes the value RV stored in the field V of the right adjacent PE(N−1) into a pixel position of the local memory 14(N), which position is specified by (RY−1).

Operation 84(*b*): If the PE 18(N) determines that the value RD5 of the right adjacent PE 18(N+1) indicates "on", the PE 18(N) writes the value RY into the buffer 16(N). In the above, the "on" state of RD5 indicates that the pixel data propagates from the center pixel of the right local memory 14(N−1) in the direction toward the position 5 (FIG. 1C). The PE 18(N) writes the value RV stored in the field V of the right adjacent PE(N+1) into a pixel position of the local memory 14(N), which position is specified by RY.

Operation 84(*c*): If the PE 18(N) determines that the value RD8 of the right adjacent PE 18(N+1) indicates "on", the PE 18(N) writes (RY+1: the value stored in the field Y plus 1) into the buffer 16(N). In the above, the "on" state of RD8 indicates that the pixel data propagates from the center pixel of the righ local memory 14(N+1) in the direction toward the position 8 (FIG. 1C). The PE 18(N) writes the value RV stored in the field V of the left adjacent PE(N+1) into a pixel position of the local memory 14(N), which position is specified by (RY+1).

In the above, the three grouped operations 80(*a*)–80(*c*), 82(*a*)–82(*b*), and 84(*a*)–84(*c*) are implemented in this order. However, the order of the operations is in no way limited to the above. Further, it is possible to simultaneously carry out the above operations.

Figure 6C:
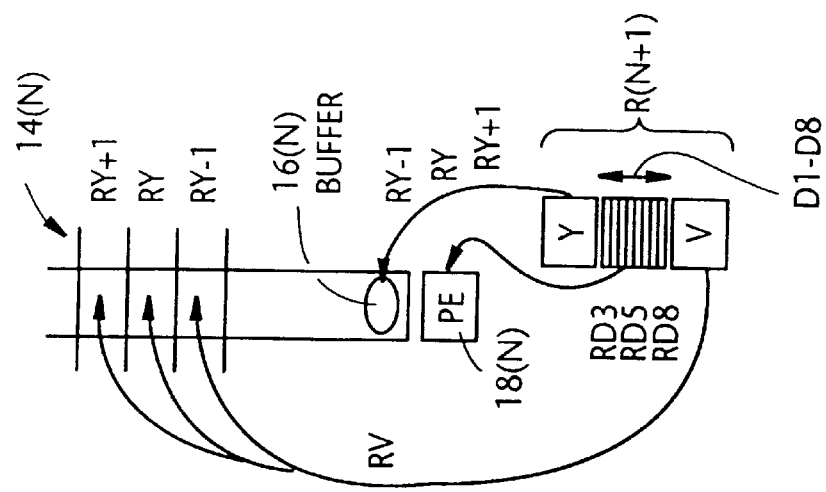
FIG. 6 is an illustration for the purpose of a better understanding of the present embodiment.
Figure 6B:
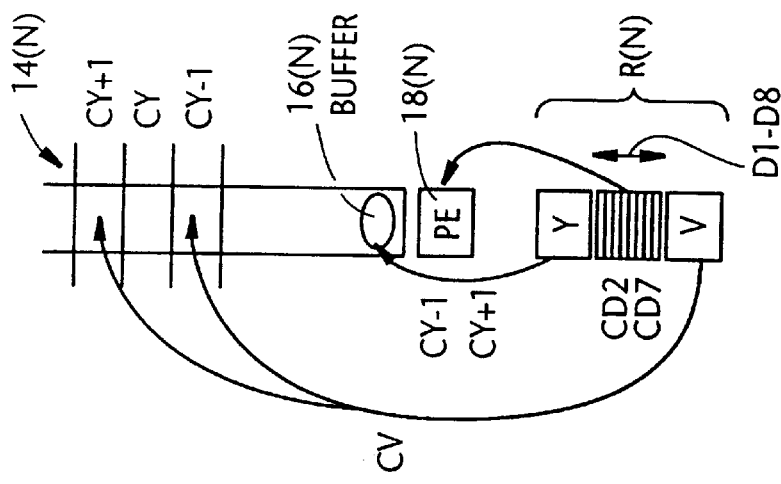
Figure 6A:
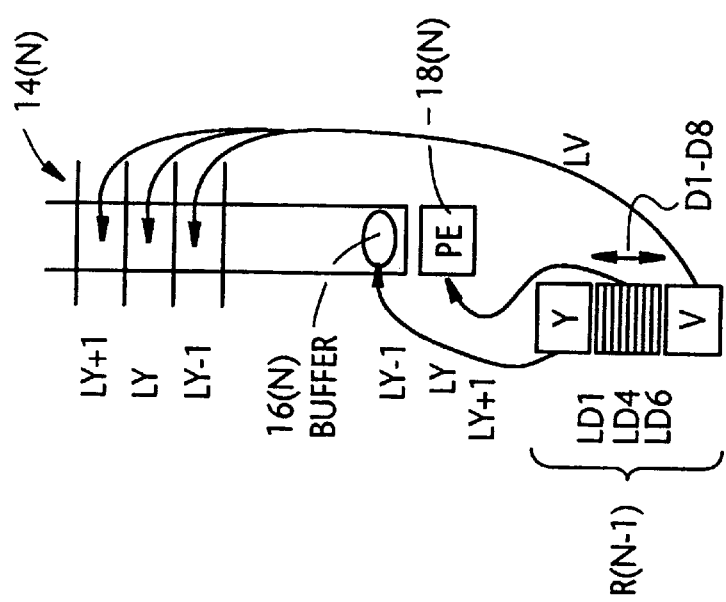

FIG. 6 is a sketch illustrating, in a different manner, the operations which have already mentioned in connection with FIG. 5C and thus, further description of FIG. 6 will be omitted for brevity.

It will be understood that the above description is representative of only one possible embodiment of the present invention and that the concept on which the invention is based in not specifically limited thereto.

What is claimed is:

1. An image processing apparatus comprising:
 a linear processor array which includes a plurality of linearly coupled processing elements;
 a plurality of local memories each taking a form of one-dimensional pixel data memories, said local memories being respectively assigned to said plurality of processing elements, said plurality of local memories being arranged so as to store in combination a two-dimensional pixel image to be processed;
 a plurality of buffers respectively assigned to said plurality of processing elements, each of said buffers storing pixel location information of at least one center pixel from which a unique pixel value is to be propagated if said center pixel exists on a corresponding local memory; and
 a plurality of register units respectively assigned to said plurality of processing elements, each register being accessed by adjoining processing elements and having first to third memory fields, said first memory field receiving said at least one center pixel from the associated buffer, said second memory field storing the unique pixel value, and said third memory field corresponding to pixel positions which surround the center pixel and storing information indicative of which directions the unique pixel value should be propagated.

2. An image processing apparatus as claimed in claim 1, wherein said third memory field has eight memory cells which correspond to eight pixel positions surrounding the center pixel.

3. An image processing apparatus as claimed in claim 1, wherein each of said buffers is provided in the corresponding local memory.

4. An image processing apparatus claimed in claim 1, wherein said first, second and third memory fields are formed by separate registers.

* * * * *